Nov. 23, 1965    J. BENOIT    3,220,005
DEVICE FOR DETERMINING THE RELATIVE POSITION OF TWO OBJECTS
Filed Feb. 25, 1963    2 Sheets-Sheet 1

Nov. 23, 1965   J. BENOIT   3,220,005
DEVICE FOR DETERMINING THE RELATIVE POSITION OF TWO OBJECTS
Filed Feb. 25, 1963   2 Sheets-Sheet 2

INVENTOR
JEAN BENOIT
BY
ATTORNEY

United States Patent Office 3,220,005
Patented Nov. 23, 1965

3,220,005
DEVICE FOR DETERMINING THE RELATIVE POSITION OF TWO OBJECTS
Jean Benoit, Grenoble, Isere, France, assignor to Etablissements Merlin & Gerin, Isere, France
Filed Feb. 25, 1963, Ser. No. 260,462
Claims priority, application France, Feb. 26, 1962, 4,437
11 Claims. (Cl. 343—112)

This invention relates to devices for determining the relative position of two objects. It is concerned more particularly with the measuring of the distance which separates two objects that move parallel in a straight line, such as travelling bridges.

In order to eliminate the danger of collision between two travelling bridges which operate on the same rolling track, signalling devices have already been employed which comprise, on the one hand, a source for emitting electromagnetic waves, and on the other hand the receiver, the weakening of the collected signal being a function of the length of the path or distance covered by the signals between the emitter and the receiver which are disposed respectively on the two bridges.

The prior art devices are not capable of providing sufficiently precise measurements and are subject to side effects caused for example by disturbances in the atmosphere.

It is therefore an object of this invention to provide a device which is free of such outside influence and which permits an exact measurement as well as furnishing warning signals upon transgressing preselected relative positions.

The device for determining the relative position of two movable objects is characterized, according to the invention, in that the electromagnetic waves emitted by a suitable source are collected by a receiver device having two receivers whose antennas have directivity diagrams which overlap partly, the receiver device being disposed relative to the source in such a manner that the incidence angle of the waves is a function of the relative position of the two objects, the relationship of the amplitude of the collected signals being determined for the purpose of indicating the relative position of the objects.

Other features and objects of the invention will appear from the following description of a few embodiments of the inventive idea without limiting the generic scope of the invention to the specific details of the embodiments chosen here for the purpose of illustrating the invention.

Figure 1:
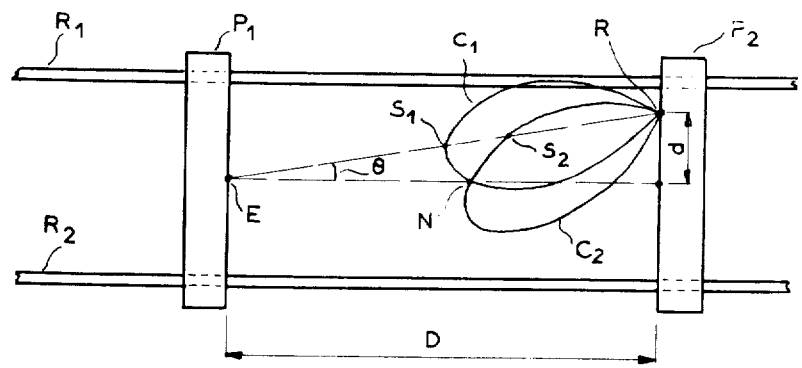
FIG. 1 shows diagrammatically an installation which includes two travelling bridges and incorporating a measuring device according to a first embodiment of the invention.

Referring to FIG. 1 of the drawing, the two travelling bridges $P_1$ and $P_2$ are adapted to move on straight rails $R_1$ and $R_2$ which may extend over several hundred yards. The bridges are controlled each independently by its own operator. The device according to the invention eliminates any danger of collision between the two bridges by indicating the distance which separates them and by producing a warning signal or actuating a release mechanism when a predetermined critical distance is reached. If desired, several different signals which would correspond to different meanings may be produced while passing different critical lines of demarcation.

The device according to the invention comprises an emitter E which broadcasts electromagnetic waves which may be either radioelectric or optical waves. The emitter is secured to bridge $P_1$ and a receiver device R is displaced relative to the emitter E perpendicularly to the direction of movement, the distance of displacement being designated by D. The directivity diagrams located in the horizontal plane $C_1$ and $C_2$ of the antennas of the receivers have the same configuration and the same phase center, inasmuch as the two receivers are located practically at the same point, but the diagrams are slightly displaced in such a manner as to overlap only partly. The incidence angle $\theta$ of the waves which are emitted is obviously a function of the distance D which separates the bridges $P_1$ and $P_2$. The direction of approach of the incident wave cuts the diagrams $C_1$ and $C_2$ respectively at $S_1$ and $S_2$ and these values represent the amplitudes of the signals which are transmitted by the two antennas of the receivers. To each pair of values $S_1$, $S_2$ corresponds a predetermined value of the angle $\theta$, thus a specific distance D between the bridges $P_1$ and $P_2$. In order to eliminate the influence of the amplitude variations of the wave which comes in at an angle $\theta$, the relationship $S_1/S_2$ of the signals furnished by the two antennas is determined. For example in the case where the emitted wave is an electromagnetic wave which is modulated by a low frequency signal the relationship $S_1/S_2$ is established in the following manner:

In each receiver the signal transmitted by the corresponding antenna is detected by a high frequency detector, is amplified by a selective amplifier adjusted to the low frequency, is again detected and the continuous current signal which results is transmitted to a logarithmic circuit. The logarithmic circuits of the two receivers operate an indicator device, a signalling device or a releasing mechanism.

It will be observed that the fluctuations of the signal transmitted due to the instability of the emitter or disturbances in the atmosphere are without influence or effect on the relationship $S_1/S_2$ inasmuch as any weakening affects the signals transmitted by the receiver antennas in the same degree. In order to eliminate the disturbances due to reflections on surrounding objects it is preferable to increase the directivity of the emitter and the receivers. For this purpose the antennas are constructed in such a manner that the directivity diagrams or response curves have the form of elongated lobes. In order to obtain a fine precision throughout the range of measurements, it is important that, on the one hand, the mean value of the incident angle corresponds to the equality axis RN of the signals and, on the other hand, that the deflection of the incident wave does not arrive at the level of the lateral lobes of the receiving diagram. A telephone signal may appropriately be superimposed on the modulating signal. In this manner the two operators of the bridges may communicate by way of radiophone. The antenna of the emitter may consist of a parabolic mirror associated with a slot antenna formed by a rectangular guide piece and placed at the center or focal point of the mirror.

Figure 5:
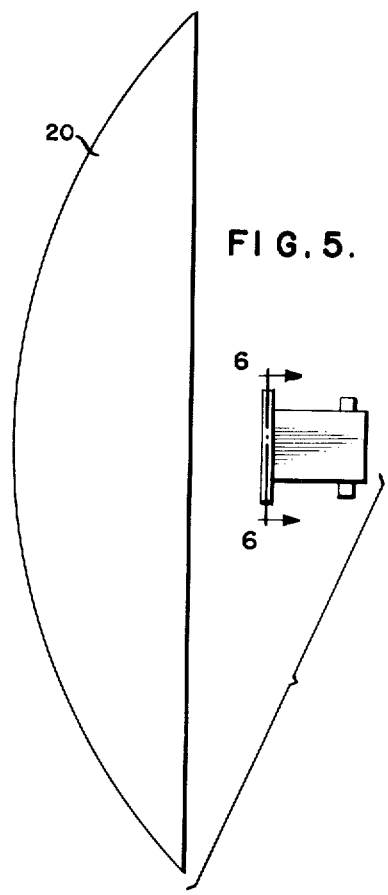
FIG. 5 shows diagrammatically a receiver antenna with two slot aerials.
Figure 6:
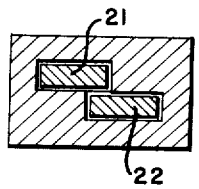
FIG. 6 is a partial sectional view taken along line 6—6 of FIG. 5, line 6—6 denoting the horizontal plane.

The receiver antennas illustrated in FIGURES 5 and 6 may comprise a common mirror 20 having two slot antennas 21, 22 which are slightly displaced horizontally relative to each other as seen clearly in FIGURE 6.

Figure 2:
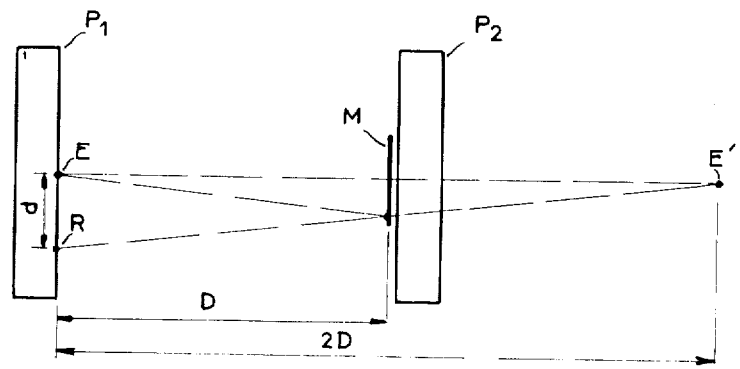
FIG. 2 shows diagrammatically a modification of the installation of FIG. 1.

FIG. 2 represents a modification of the system described above.

The emitter and the receiver device are disposed on the same bridge $P_1$ and the receivers receive the signal by means of a mirror M, which may be an optical or a screen type mirror depending on the circumstances, and arranged on the other bridge $P_2$. The simulated emitter is located at a distance 2D from the receiver device in the case of the same range of distances to be measured, the angular deflection which takes place is half that produced in the installation of FIG. 1.

Another advantage resides in the fact that the electric supply of bridge $P_2$ may be cut off in the case where the latter is not used.

Figure 3:
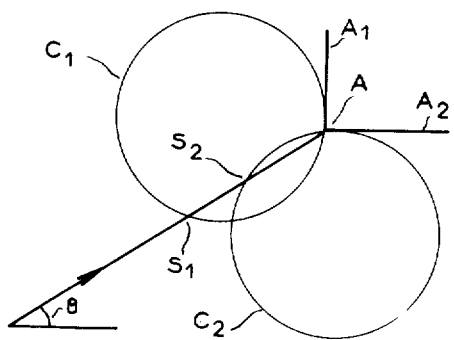
FIG. 3 illustrates an optical device according to the invention.

It is understood that the radioelectric wave may be substituted by an optical wave which consists for example of an infra-red beam. This solution is particularly interesting when very small distances are to be determined. In this case the source E emits a beam of light and the receivers are photosensitive cells. As shown in FIG. 3 of the drawing, two photosensitive surfaces $A_1$ and $A_2$ are employed which are perpendicular to each other. The diagrams $C_1$ and $C_2$ are in that case circular. The lack of directional indication of the receivers may be compensated for a substantial directivity of the source E.

Figure 4:
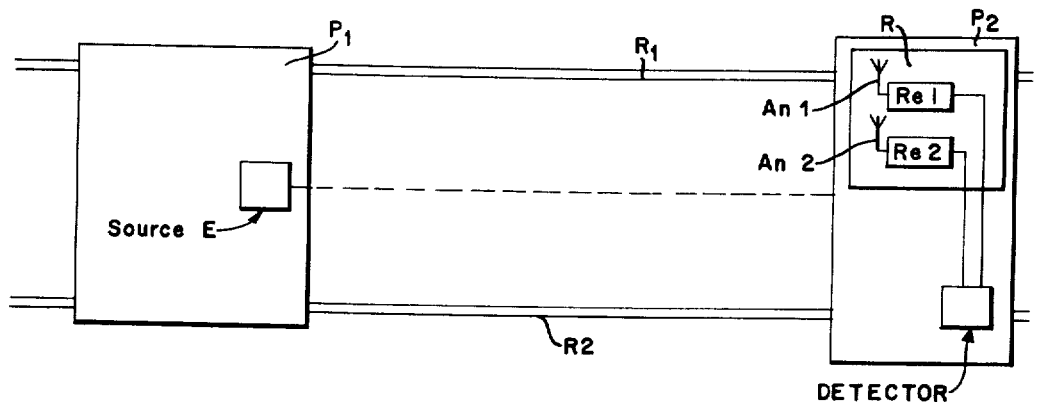
FIG. 4 shows a diagram illustrating the invention more specifically.

FIGURE 4 shows the two bridges $P_1$ and $P_2$ movable on rails $E_1$ and $R_2$, similar to FIGURE 1. Bridge $P_1$ carries the source or emitter which sends out the electromagnetic waves. The receiving device R is located on the bridge $P_2$ and comprises two antennas $An_1$ and $An_2$ associated with a receiver $Re_1$ and $Re_2$ respectively, which are connected to a signal detector device.

It is understood that the device according to the invention is suitable for other applications besides measuring the distance between two objects which move parallel in a straight line.

Thus it is possible for example to determine the position of an object which travels at an angle relative to another object. Generally, the device according to the invention allows the determination of the relative position of two movable objects whose relative position comprises only one degree of freedom.

What is claimed is:

1. Device for determining the relative position of two movable objects constrained to move in predetermined parallel paths comprising in combination:
    a source of electromagnetic waves mounted on one of said two objects,
    a receiver device mounted on the other of said two objects,
    said receiver device including two receivers for said waves having two antennas disposed one relative to the other to provide a partial overlapping of their directivity diagrams,
    said receiver device being offset relative to the source perpendicular to the direction of displacement of the source, said two receivers of said receiver device including means to detect the magnitude of the amplitude of said waves,
    and means to compare the amplitudes respectively detected by said two receivers.

2. The device according to claim 1 wherein said electromagnetic wave source comprises a reflector device, and a further electromagnetic wave source mounted on the other of said two objects, said reflector device being disposed in position to reflect waves from said further electromagnetic wave source towards said receiving device.

3. A device according to claim 1, wherein said two receivers are oriented one to the other to have the points of intersection of the two directivity diagrams of said antennas with the said waves in the vicinity of the means position of the line joining said source and said receiver device.

4. A device according to claim 1, wherein the directivity diagrams have an elongated form.

5. A device according to claim 1, including means to superimpose audible frequency waves to the waves emitted by said source.

6. The device according to claim 1, wherein the directivity diagrams of the antennas of the receiver device have the same configuration and the same phase center.

7. The device according to claim 1, wherein the signal emitted by the source is a high frequency signal modulated in amplitude.

8. The device according to claim 1, wherein the antenna of the emitter comprises a parabolic mirror in the center of which a slot antenna is located, the receivers having a common parabolic mirror in whose focal region two grooved antennas are located which are slightly displaced relative to each other.

9. The device according to claim 1, wherein the wave emitted by the source consists of a light beam, the receiver device having two photosensitive surfaces.

10. The device according to claim 9, wherein the photosensitive surfaces are perpendicular to each other.

11. The device according to claim 1, including a warning device for emitting signals when one or more predetermined distances between the objects have been reached.

References Cited by the Examiner

UNITED STATES PATENTS

| 2,109,475 | 3/1938 | Fanning | 343—123 |
| 2,181,778 | 11/1939 | Ball | 250—215 X |
| 3,011,580 | 12/1961 | Reid | 343—112 X |
| 3,046,549 | 7/1962 | Kalmus. | |

FOREIGN PATENTS 1,156,955  11/1963  Germany.

CHESTER L. JUSTUS, *Primary Examiner.*